US007362008B2

(12) United States Patent
Brown

(10) Patent No.: US 7,362,008 B2
(45) Date of Patent: Apr. 22, 2008

(54) ELECTRICAL INTERFACE EXTENSION WITH ISOLATION FUNCTION

(75) Inventor: Darrell M. Brown, Euless, TX (US)

(73) Assignee: RadioShack, Corp., Fort Worth, TX (US)

( * ) Notice: Subject to any disclaimer, the term of this patent is extended or adjusted under 35 U.S.C. 154(b) by 376 days.

(21) Appl. No.: 11/139,459

(22) Filed: May 27, 2005

(65) Prior Publication Data

US 2006/0268481 A1 Nov. 30, 2006

(51) Int. Cl.
*H02J 1/00* (2006.01)

(52) U.S. Cl. .......... 307/80

(58) Field of Classification Search .......... 307/80
See application file for complete search history.

(56) References Cited

U.S. PATENT DOCUMENTS 5,513,999 A * 5/1996 Fry et al. .......... 439/188
5,520,470 A * 5/1996 Willett .......... 400/88
5,792,986 A 8/1998 Lee
2004/0115988 A1* 6/2004 Wu .......... 439/497
2005/0245115 A1* 11/2005 Bell et al. .......... 439/165

OTHER PUBLICATIONS

Internet web page located at: http://mcm.newark.com/NewarkWebCommerce/mcm/en_US/endecaSearch/partDetail.jsp?SKU=24-6595&N=4, which . . . .
Identifies a MCM Part number 24-6595 Rear Panel Extender Stereo A/V Plus S-Video cable (copy of web page attached hereto.

* cited by examiner

*Primary Examiner*—Robert L. DeBeradinis
(74) *Attorney, Agent, or Firm*—Dan Brown Law Office; Daniel R. Brown

(57) ABSTRACT

An apparatus for selectively coupling electrical connectors. The apparatus includes a common connector electrically coupled to a secondary connector and a primary connector electrically coupled to the common connector through an isolation means. The isolation means operates to electrically isolate the primary connector upon detection of an external connection to the secondary connector.

12 Claims, 4 Drawing Sheets

2

ELECTRICAL INTERFACE EXTENSION WITH ISOLATION FUNCTION

BACKGROUND OF THE INVENTION

1. Field of the Invention

The present invention relates to electrical cables and connectors. More specifically, the present invention relates to electrical interface extension cables with an automatic isolation function for switching between a primary input and a secondary input.

2. Description of the Related Art

User accessible interface connectors are prevalent in modern electrical and electronic devices. Such connections are provided on most audio and video devices, as well as computing devices, games, power devices, appliances, cameras, camcorders, and so forth. Electrical connections include terminals, plugs, jacks, and other types of electrical connections, which are typically coupled to, or used to couple with, an electrical cable or wire. There are a large number of promulgated standards that define both the physical and electrical connection standards, and there are perhaps a greater number of proprietary interface designs used by manufacturers of such devices. Some devices present plural connections that correspond to plural difference interface specifications.

One common manifestation of an electrical connection is the input terminal to a device or appliance. An input may be for coupling an external power source, an external signal source, or plural signal sources, an external data source, or other input source connection. For example, a television or video display terminal typically has a group of input connectors for coupling audio and video signals from an external source, such as a DVD player or video camcorder. A common purpose and feature of the user accessible electrical interface connector is the flexibility it provides in connecting and disconnecting one or more external sources from time to time. In some instances a user couples a signal source to an input connector on a device that stays connected permanently. An example is the connection from a DVD player to the input connectors on the back of a television set, which is typically connected once and remains so for an extended period of time. In other instances, an input source is connected and disconnected from time to time as a matter of user convenience. An example is the connection between a portable video camcorder and a television set. In this example, the user moves about recording video and audio content with the camcorder, and later couples the camcorder to the television when playback is desired. For playback, the devices are connected, and for recording, the devices are disconnected.

While the presence of user accessible electrical interface connectors is a convenience for users, it also defines connection and disconnection tasks that user must accomplish in order to connect devices together. In the case where a connection is made on a largely permanent basis, the task of making the connection is a minimal inconvenience. In the case where a device is connected and disconnected more frequently, the connection task becomes more substantial. In another situation, where two or more input sources are intermittently coupled to a single set of electrical connections, that task of connecting and disconnecting becomes an inconvenience. An example of this is where a user desires to couple both a DVD player and a video cassette player to a television set that has just a single set on input connectors. This situation forces the user to disconnect one input source and re-connect the other every time a change is made from one source to another. The inconvenience is exacerbated in the case where the television external input connectors are not conveniently located, such as being placed on the back of the television, which is set into a cabinet that does not offer access to the back of the set. A similar scenario can readily be envisioned for output connections to plural input connections as well.

The prior art has addressed the problem of dealing with inconveniently located electrical interface connectors. Several manufacturers make and sell extension cables that extend an input connector from an inconvenient location to a more convenient location. An example of this is the audio and video extension cable that is connected to the audio and video inputs on the back of a television set, and allows the user to route the cable to a convenient location, where a duplicate set on input terminals is presented for coupling external input sources. This solution, however, does not overcome the issue of switching between plural input sources to a single input terminal. Thus it can be understood that there is a need in the art for a apparatus and method of overcoming the problems associated with both inconveniently located electrical connections and user's need to connect more input sources that available input connectors provide for.

SUMMARY OF THE INVENTION

The need in the art is addressed by the apparatus and methods of the present invention. An apparatus for selectively coupling electrical connectors is taught. The apparatus includes a common connector electrically coupled to a secondary connector and a primary connector electrically coupled to the common connector through an isolation means. The isolation means operates to electrically isolate the primary connector upon detection of an external connection to the secondary connector.

In a specific embodiment of the foregoing apparatus, the secondary connector is electrically coupled through an extension cable. In another specific embodiment, the isolation means is a switch. The switch may be integral with the secondary connector. The switch may be actuated by force of the external connection. In another specific embodiment of the invention, the external connection is detected by a signal detection means sensitive to the presence of a signal on the secondary connector, and coupled to the isolation means.

In a specific embodiment of the invention, the secondary connector is an S-video standard compliant connector, and the isolation means is a switch mechanically coupled to a plunger in the S-video connector. The apparatus operates such that the external connection to the S-video connector actuates the switch thereby electrically isolating the primary connector.

In another specific embodiment of the invention, the apparatus further includes plural common connectors. Also, plural secondary connectors, plural primary connectors, and plural isolation means each corresponding to the plural common connectors, thereby implementing plural parallel selective coupling electrical paths. In another embodiment of the invention, every electrically coupled connection is individually shielded with a ground conductor, thereby providing high noise immunity of signals coupled through the apparatus.

The present invention also teaches a method of selectively coupling electrical signals between a common connector, a secondary connector electrically coupled to the common connector, and a primary connector. The method includes the steps of electrically coupling the primary connector to the common connector, and electrically isolating the primary connector from the common connector upon detecting an external connection to the secondary connector.

In a specific embodiment of the foregoing method, the isolating step is accomplished by switching the electrical coupling between the primary connector and the common connector. The switching step may be motivated by force of the external connection. The detecting step may be accomplished by detecting the presence of an electrical signal on the secondary connector.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

Figure 1:
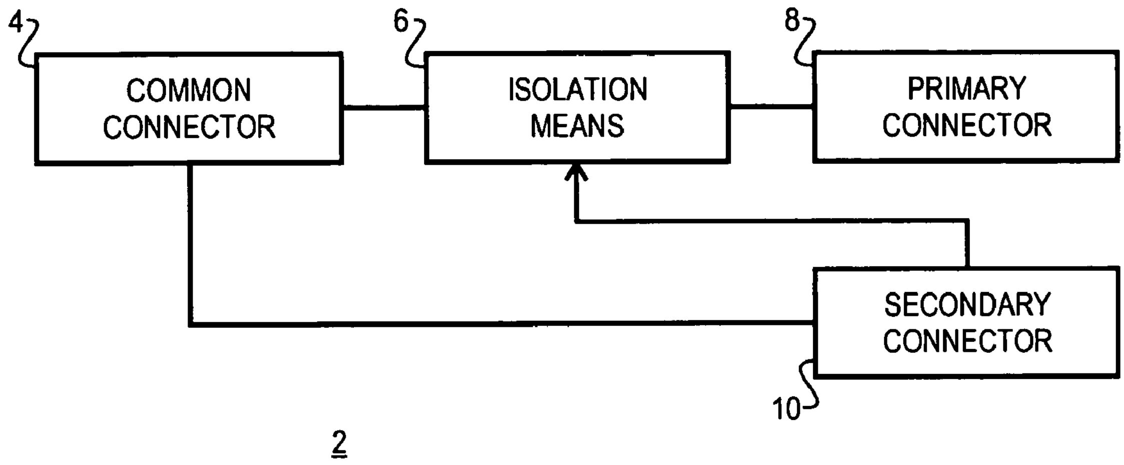
FIG. 1 is a functional block diagram according to an illustrative embodiment of the present invention.

The apparatus and methods of the present invention overcome the aforementioned problems in the prior art. An illustrative embodiment is directed to the common issue of coupling plural audio and video signal outputting devices to a television set or video monitor that has a limited number of audio and video input connectors. The problem of inconveniently located audio and video input connectors on television sets and video monitors is also addressed in the illustrative embodiment. While it is aesthetically pleasing to locate the audio and video input connectors at the rear of a television set, as this hides the interconnecting cables from view, it is problematic in the case where a user needs to access the connectors in order to connect and disconnect peripheral devices, such as audio and video signal outputting devices. As noted hereinbefore, some peripheral devices are connected on a permanent basis, while others are intermittently connected to a television set. Permanent connections are best kept out of view, such as by locating them to the rear of a television set. Intermittently connected peripherals are more conveniently located at the front, side or other accessible location. The present invention provides a novel solution employing a three, or more, connector device. A common connector is coupled to a common connection point, which is the input jack at the rear of a television set in the illustrative embodiment. A primary connection is provided for a peripheral that is permanently connected, and a secondary connection is provided for a peripheral that is intermittently connected. To avoid interference between the two types of peripherals, an isolation means is provided. FIG. 1 illustrates the generalized form of the apparatus of the present invention.

Reference is directed to FIG. 1, which is a functional block diagram according to an illustrative embodiment of the present invention. The apparatus is a three-connector interconnecting device 2 for coupling electrical signals of varying types. A common connector 4 is electrically coupled to a secondary connector 10. In a typical application of the apparatus 2, the common connector 4 is coupled to a connector on a host device, which is the connector that is to be shared between two, or more, other peripheral devices. This explains the use of the term "common" to name the common connector 4. The electrical coupling between the common connector 4 and the secondary connector 10 couples electrical signals between the two connectors. In a typical application, a secondary peripheral device is intermittently connected to the secondary connector 10. Note that whenever a peripheral device is coupled to the secondary connector 10, it is also electrically coupled to the common connector 4. The common connector 4 is also electrically coupled to a primary connector 8, through an isolation means 6. In a typical application of the apparatus 2, a peripheral device that is permanently coupled to the host device is connected to the primary connector 8. Note however, that the electrical coupling between the common connector 4 and the primary connector 8 can be isolated by the isolation means 6. The isolation means can be any physical device, or any lack of continuity in an electrical circuit, known to those skilled in the art to be useful in isolating the coupling of electrical signals. A switch, semiconductor, and insulating substance are examples of isolation means that are known to those skilled in the art and that are suitable under the teachings of the present invention.

To prevent interference between signals connected to the primary connector 8 and secondary connector 10 as they are electrically coupled to the common connector 4, the isolation means 6 is enabled and disabled according to the presence or absence of a peripheral device being connected to the secondary connector 10. When a peripheral device is connected to the secondary connector 10, then signals from that peripheral are electrically coupled to the common connector 4. At the same time, the isolation means 6 is enabled, thereby isolating the electrical coupling between the primary connector 8 and the common connector 4. Conversely, when the peripheral device is disconnected from the secondary connector 10, then the isolation means 6 is disabled, so that the primary connector 10 and common connector 4 are electrically coupled together. In this way, the permanently connected peripheral at the primary connector 8 is always coupled to the common connector 4, unless an intermittently coupled peripheral device is connected to the secondary connector 10, at which time the permanently connected peripheral is isolated by the isolation means 6.

Those skilled in the art will appreciate the generalized description regarding FIG. 1. Virtually any type of electrical connectors can be used to implement the invention. Various terminals, plugs, jacks, and other connections are suitable, including power connectors, audio connectors, video connectors, data connectors, radio frequency connectors and so forth. The electrical coupling circuits can be similarly varied depending on the application. Wires, cables, printed circuit traces, power handling, distributed impedance, and virtually any other conductive means could readily be employed.

Figure 2:
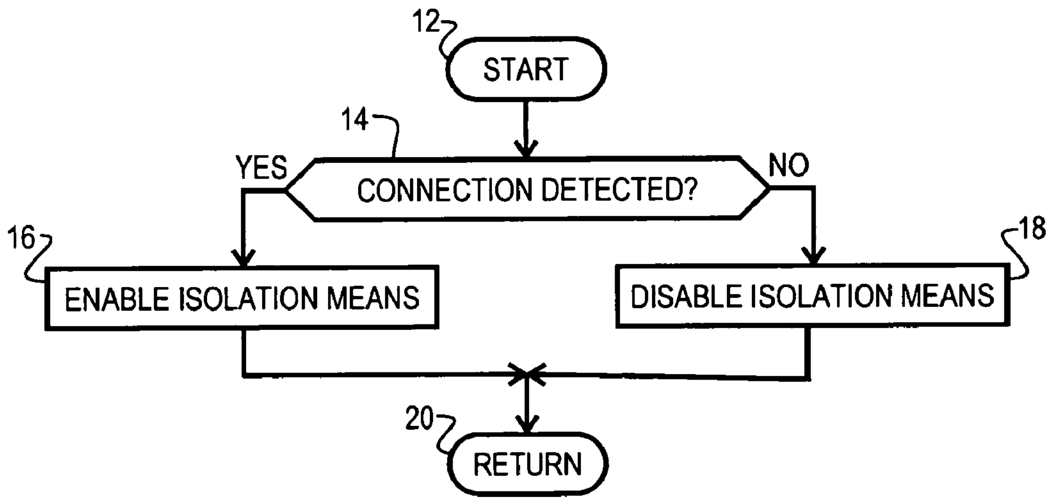
FIG. 2 is a process flow diagram according to an illustrative embodiment of the present invention.

Reference is directed to FIG. 2, which is a process flow diagram according to an illustrative embodiment of the present invention. The process described in FIG. 2 corresponds generally with the apparatus of FIG. 1. The process in FIG. 2 begins at step 12 and proceeds to step 14, where a test is made to determine if an external device has been connected to the secondary connector. If no connection is detected at step 14, then flow proceeds to step 18 where the isolation means is disabled such that electrical coupling exists between the common connector and the primary connector. On the other hand, at step 14, if a connection is detected at the secondary connector, then the process flow proceeds to step 16. At step 16, the isolation means is enabled, thereby isolating the primary connector from the common connector, thus enabling the secondary connector to be electrically coupled to the common connector without interference from any device coupled to the primary connector. From either the disabling step 18 or the enabling step 16, the process returns via step 20. In a typical application, the process described herein is looped indefinitely, thereby quickly responding to the connection and disconnection of a peripheral device at the secondary connector.

Figure 3:
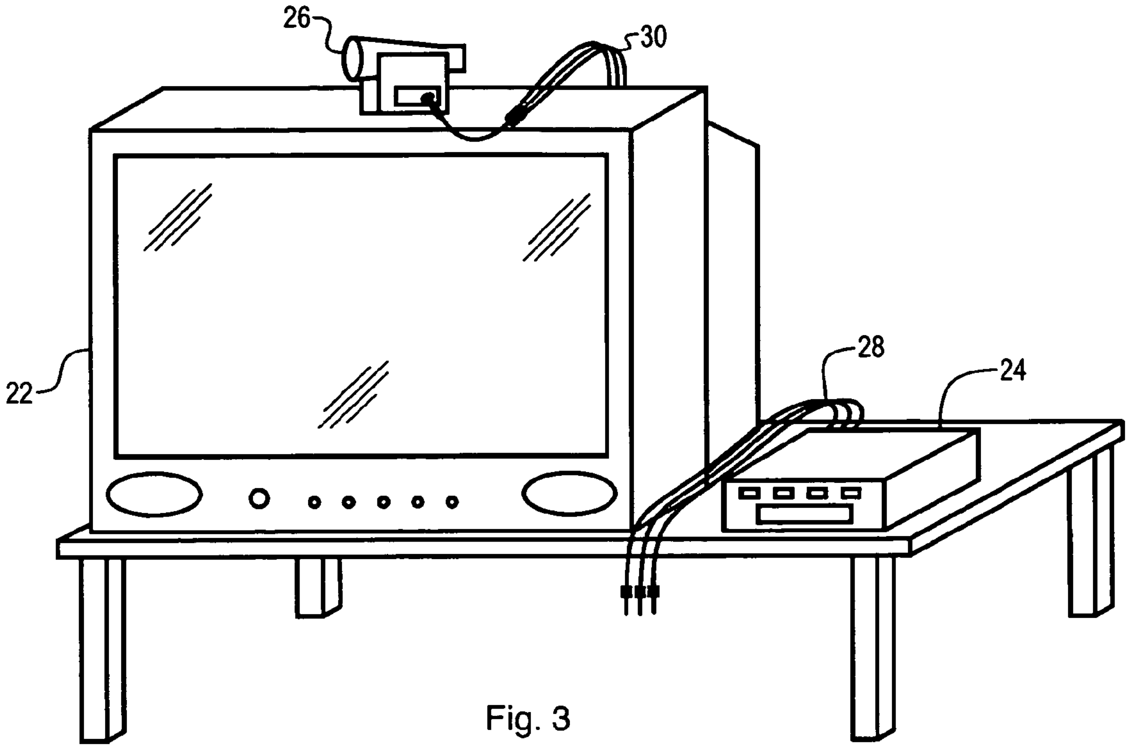
Fig. 3 Prior Art
FIG. 3 is a drawing of a prior art electrical interconnection system.

Reference is directed to FIG. 3, which is a drawing of a prior art application of an electrical interconnection system. The illustration shows a typical application where a user has a television set 22 that has audio and video input jacks (not shown) at the rear of the television. A DVD player 24 is normally, and preferably permanently, coupled to the television set 22 via jumper cables 28. However, the jumper cables 28 are shown in a disconnected state in FIG. 3 because the user has decided to temporarily connect a camcorder 26 using a special camcorder interconnecting cable 30, which couples directly to the audio and video connectors at the rear of the television set 22. In order for the user to accomplish the transition between DVD 24 playback and camcorder 26 playback, they must reach around behind the television set 22 to disconnect the DVD jumper cables 28 and connect the camcorder jumper cables 30. Depending on the user's environment and type of television set, this can range from a mildly inconvenient task to a nearly impossible task.

Figure 4:
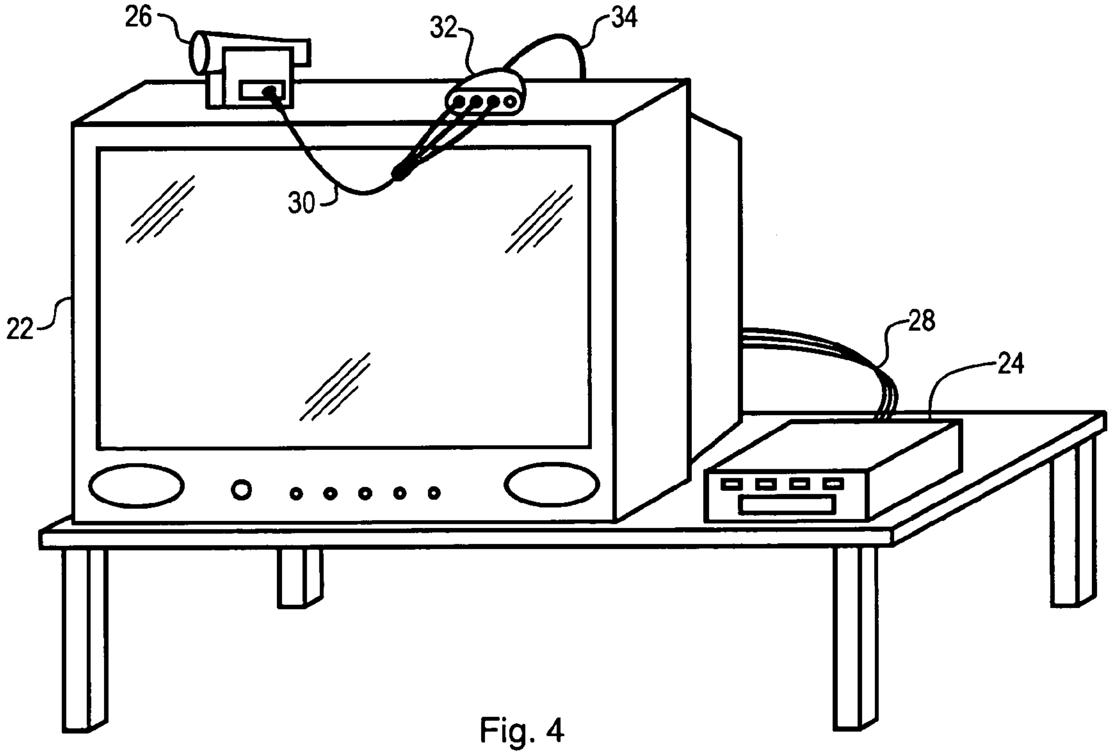
FIG. 4 is a drawing of an electrical interconnection system according to an illustrative embodiment of the present invention.
Figure 5:
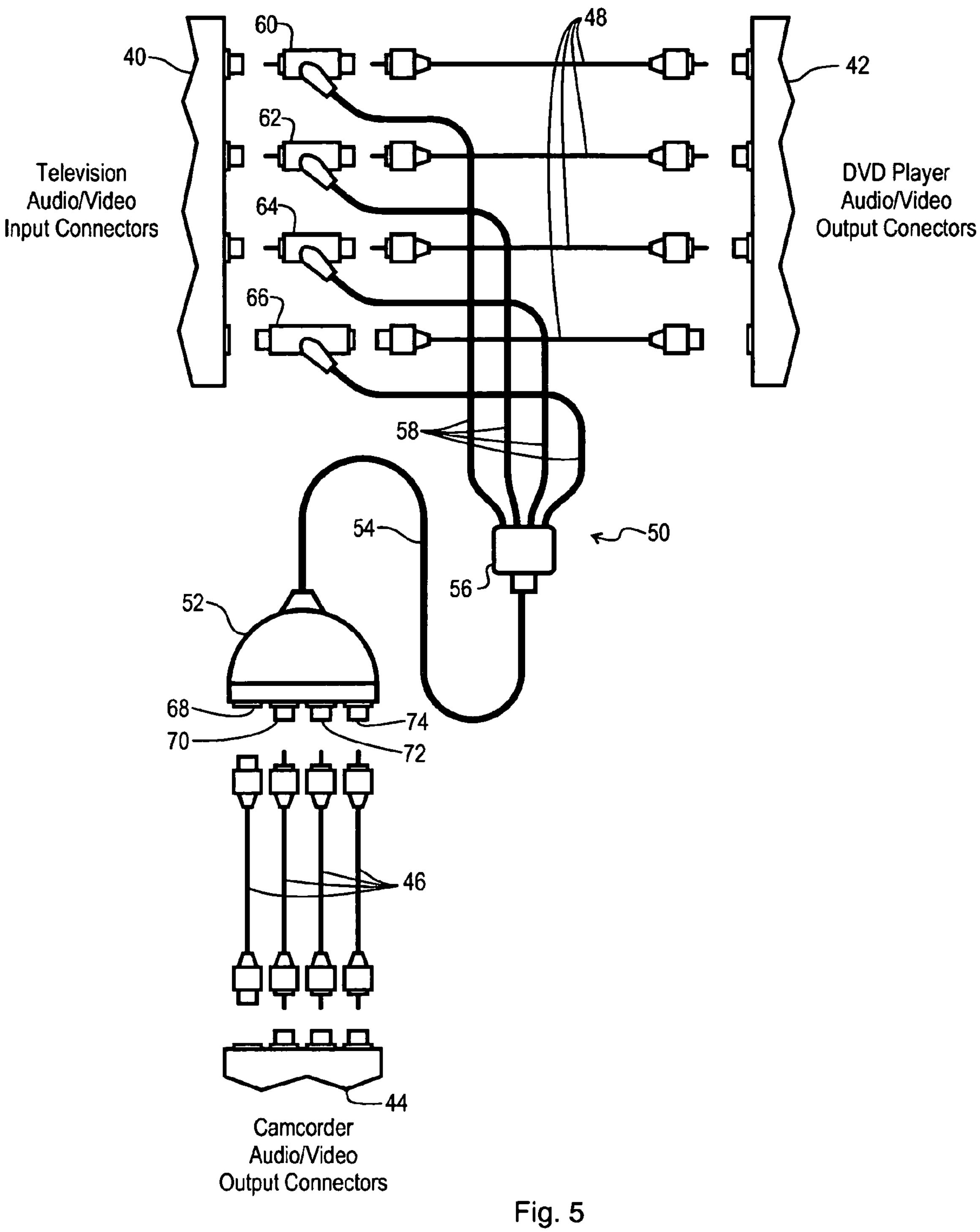
FIG. 5 is an interconnection diagram according to an illustrative embodiment of the present invention.

Reference is now directed to FIG. 4, which is a drawing of an electrical interconnection system according to an illustrative embodiment of the present invention. This illustration depicts a similar scenario as in FIG. 3 with the television set 22, the DVD player 24 and the camcorder 26. However, in FIG. 4, the user has implemented an electrical interface extension with isolation function and cable apparatus according to an illustrative embodiment of the present invention. The illustrative embodiment presents a duplicate set of audio and video connectors 32 that is conveniently located for easy access by the user, and is connected to the audio and video connectors (not shown) at the rear of the television set 22 by cable 34. The user connects the camcorder jumper cable 30 to a secondary set of connectors 32 on the illustrative embodiment apparatus. The DVD player jumper cables 28 are connected to a primary set of connectors (not shown) on the illustrative embodiment apparatus, which are located at the rear of the telephone set and adjacent to the television set input audio and video connectors (not shown). Since the DVD player 24 is permanently connected, the location of the primary connectors at the rear of the television is preferable from and aesthetic point of view. An isolation function in the illustrative embodiment apparatus causes the primary connection, which is the connection to the DVD player 24, to be isolated whenever the secondary device, that is the camcorder 26, is connected to the secondary connectors 32. FIG. 5 provides a more detailed diagram of an interconnection scheme.

Reference is directed to FIG. 5, which is an interconnection diagram according to an illustrative embodiment of the present invention. A television audio and video input connector panel 40 is shown, in part. As is known to those skilled in the art, such panels typically include left and right stereo audio connectors, a composite video connector, and an S-video connector. Each is implemented as an electrical jack with the audio and composite video being RCA phono specification jacks and the S-video following the S-video jack interface specification. Also illustrated in FIG. 5 are a typical DVD player audio and video output jack panel 42, and a camcorder audio and video output jack panel 44. Again, each of these panels includes stereo audio, composite video, and S-video jacks, as are known to those skilled in the art. An electrical interface extension apparatus 50 with isolation function according to an illustrative embodiment of the present invention is used to interconnect the three jack panels 40, 42, 44 in such a way that the television inputs are shared without interference between the output signals from the DVD player 42 and the output signals from the camcorder 44. The apparatus 50 includes four isolation connectors 60, 62, 64, 66 and each includes a common connector plug that is connected to the television audio and video connector panel jacks, and a primary connector jack that is connected to the DVD player audio and video connector panel jacks via a corresponding jumper cable 48. The term "primary" indicating that the DVD player 42 connection is the permanent connection as opposed to the camcorder 44 connection, which is connected intermittently by the user. Note that FIG. 5 illustrates all four connectors 60, 62, 64, 66 connected in circuit, however, in a typical installation, the S-video or composite video are connected alternatively.

Each isolation connector 60, 62, 64, 66 is coupled via a cable 58 to a cable hub 56 that consolidates the internal conductors to a common cable 54 that terminates at a secondary connector housing 52, which presents the four secondary connectors for user access. The four secondary connectors are S-video 68, composite video 70, left audio 72, and right audio 74 jacks, which are coupled via camcorder jumper cables 46 to the corresponding jacks on the camcorder connection panel 44. All of the jumper cables 46, 48 are of conventional design, as are known to those skilled in the art. The default connection of the apparatus 50 is for each isolation connector 60, 62, 64, 66 to electrically couple the common connector side to the primary connector side, that is the television to the DVD player in the illustrative embodiment, so long as there is no connection made to the corresponding secondary connectors 68, 70, 72, 74. However, whenever a connection is made to one of the secondary connectors 68, 70, 72, 74, then the corresponding isolation connector 60, 62, 64, 66 electrically isolates its common side form its primary side, while electrically coupling the corresponding secondary connector to its common connector. In this manner, the permanently connected DVD player is connected to the television set by default until the user connects the jumper cables 46 from the camcorder. At the time of that connection, the DVD player 42 is isolated from the television set 40 and the camcorder 44 is connected without interference.

Figure 6:
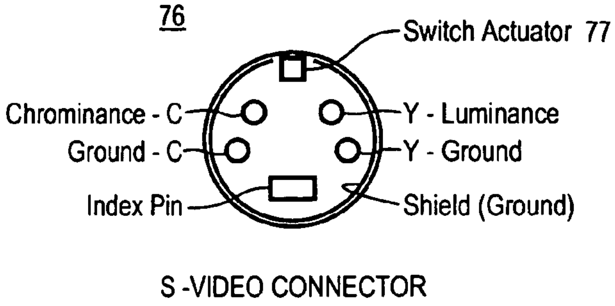
FIG. 6 is a diagram of an S-video connector according to an illustrative embodiment of the present invention.

Reference is directed to FIG. 6, which is a diagram of an S-video connector 76 according to an illustrative embodiment of the present invention. While the S-video connector 76 is an industry standard, it is pertinent to an illustrative embodiment in that a switch actuator, or plunger, 77 is presented at the connector interface, which is used to detect the presence of a connected device. When a plug is inserted into the S-video jack 76, the switch actuator plunger 77 is depressed and changes the state of a switch (not shown) that is internal to the connector 76, which purpose will be more fully described hereinafter. The S-video connector further includes the electrical shield held at ground potential, the chrominance signal and its related ground conductor, the luminance signal and its related ground conductor, as well as an indexing pin to orient the paired jack and plug connectors. Again, this is an industry standard interface known to those skilled in the art.

Figure 7:
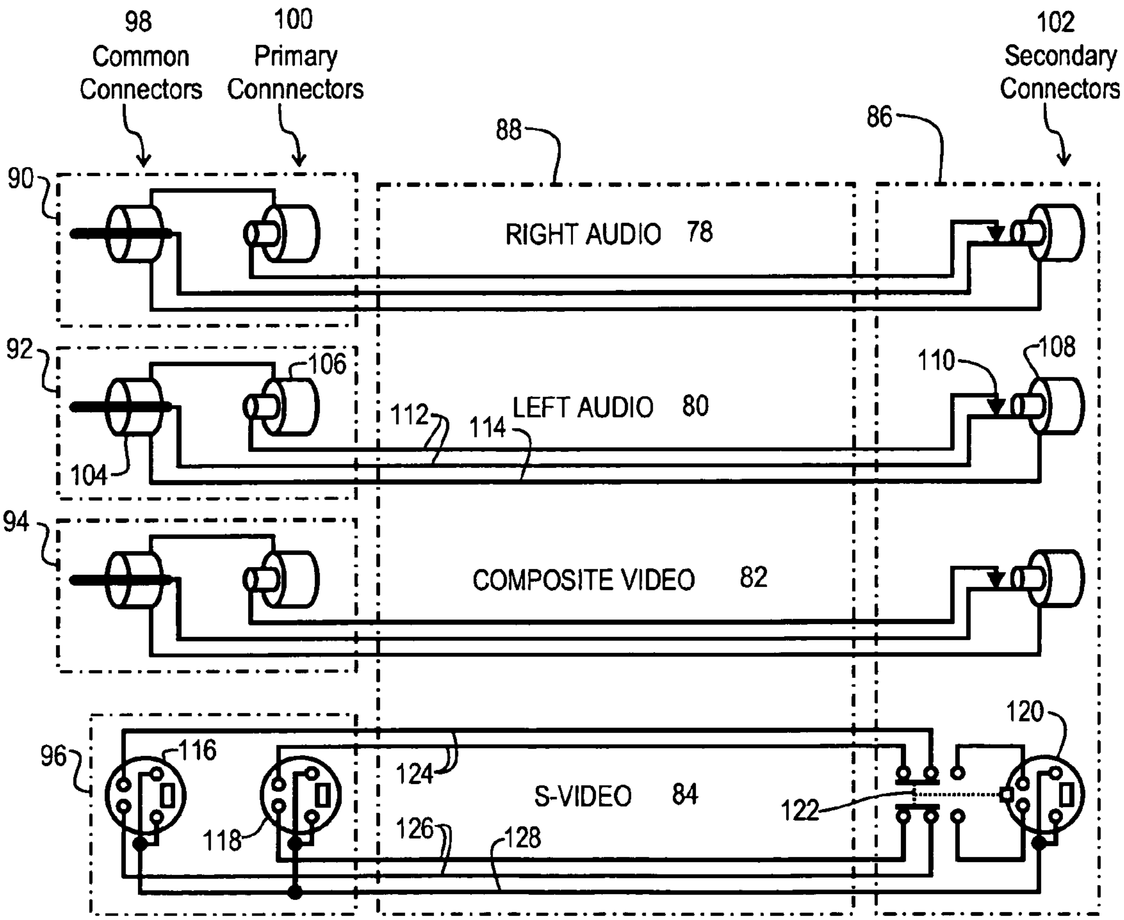
FIG. 7 is a schematic diagram of an electrical interface extension with pass through function according to an illustrative embodiment of the present invention.

Reference is directed to FIG. 7, which is a schematic diagram of an electrical interface extension apparatus with isolation function according to an illustrative embodiment of the present invention. In the illustrative embodiment, there are four isolation connectors 90, 92, 94, 96 that correspond to the four electrical coupling circuits for the right audio channel 78, left audio channel 80, composite video channel 82 and S-video channel 84, respectively. Each isolation connector 90, 92, 94, 96 includes both a common connector 98 and a primary connector 100. All are coupled via cable assembly 88 to a secondary connector enclosure 86 that supports for four corresponding secondary connectors 102. Each of the right audio channel 78, left audio channel 80, and composite video channel 82 share the same physical structure, which will be now described by reference to the left audio channel 80 in the drawing figure.

The common connector 104 is an RCA phono plug. The primary connector 106 is an RCA phono jack. Both of these connectors 104, 106 are molded into a thermoplastic isolation connector housing 92 that insulatively supports the two connectors. The ground rings are coupled to a common ground conductor 114. The signal conductors 112 from both connectors 104, 106 are routed through the cable assembly 88 to the secondary connector enclosure 86. Within that enclosure 86 is the corresponding secondary connector 108 and the related isolation means, which is a connection-activated switch 110 in the illustrative embodiment. The secondary connector 108 is an RCA phono jack, and its ground ring is also coupled to ground conductor 114. In operation, when there is no connection made to the secondary connector 108, the switch 110 is closed so that the signal conductors 112 are electrically coupled, thus enabling the pass through of signals between the common connector 104 and the primary connector 106. When an RCA phono plug is inserted into secondary connector 108, the switch 110 opens, thereby isolating the common and primary connectors, while maintaining electrical connection between the secondary connector 108 and the common connector 104. The S-video channel 84 operates on a similar principle.

The S-video isolation connector 96 includes an S-video plug 116 and S-video jack 118, which are the common connector and primary connector respectively. The ground conductors 128 are all combined to the same electrical potential, although separate shielding is employed for each signal line to improve noise immunity. The luminance conductors 124 and chrominance conductors 126 from each of the common connector 116 and primary connector 118 are routed through cable assembly 88. Within the secondary connector housing 86 is the secondary connector 120, which is an S-video jack in the illustrative embodiment. The switch actuator of the secondary connector 120 is coupled to actuate a double-pole, double-throw switch 122 in the housing 86. When an S-video plug is inserted into secondary connector 120, the switch 122 changes state from the default state (as illustrated), thereby isolating the chrominance and luminance signals of the common and primary connectors, while maintaining electrical connection of the chrominance and luminance signals between the secondary connector 108 and the common connector 104.

Those skilled in the art will appreciate that a variety of connector types, signal types, and isolation means may be employed to achieve the beneficial function of the present invention. Apparatus can be envisioned that employ a single electrical coupling path, four paths as illustrated in FIG. 7, or any other number of paths as may be required by a system designer. While a mechanical switch is employed as the isolation means in the illustrative embodiment, semiconductor devices, relays, and insulative devices could also be employed.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A signal extension cable apparatus for selectively coupling electrical connectors, comprising:

a common connector;

a secondary connector electrically coupled to said common connector through an extension cable;

a primary connector electrically coupled to said common connector through an isolation means, and wherein said isolation means is operable to electrically isolate said primary connector upon detection of an external connection to said secondary connector.

2. The apparatus of claim 1 wherein said isolation means is a switch.

3. The apparatus of claim 2 wherein said switch is integral with said secondary connector.

4. The apparatus of claim 2 wherein said switch is actuated by force of the external connection.

5. The apparatus of claim 1 wherein the external connection is detected by a signal detection means sensitive to the presence of a signal on said secondary connector, and coupled to said isolation means.

6. The apparatus of claim 1, and wherein:

said secondary connector is an S-video standard compliant connector, and said isolation means is a switch mechanically coupled to a plunger in said S-video connector such that the external connection thereto actuates said switch thereby electrically isolating said primary connector.

7. The apparatus of claim 1, further comprising:

plural common connectors, and plural secondary connectors, plural primary connectors, and plural isolation means each corresponding to said plural common connectors, thereby implementing plural parallel selective coupling electrical paths.

8. The apparatus of claim 7 wherein every electrically coupled connection is individually shielded with a ground conductor, thereby providing high noise immunity of signals coupled therethrough.

9. A method of selectively coupling electrical signals between a common connector, a secondary connector electrically coupled to the common connector through a signal extension cable, and a primary connector, comprising the steps of:

electrically coupling the primary connector to the common connector, and electrically isolating the primary connector from the common connector upon detecting an external connection to the secondary connector.

10. The method of claim 9 wherein said isolating step is accomplished by switching the electrical coupling between the primary connector and the common connector.

11. The method of claim 10 wherein said switching step is motivated by force of the external connection.

12. The method of claim 9 wherein said detecting step is accomplished by detecting the presence of an electrical signal an the secondary connector.

* * * * *